March 6, 1928. 1,661,555

J. W. BRYCE

SCALE

Filed May 12, 1921 4 Sheets-Sheet 1

Inventor
James W. Bryce
By his Attorneys
Kerr Page Cooper & Hayward

March 6, 1928.
J. W. BRYCE
1,661,555
SCALE
Filed May 12, 1921
4 Sheets-Sheet 2
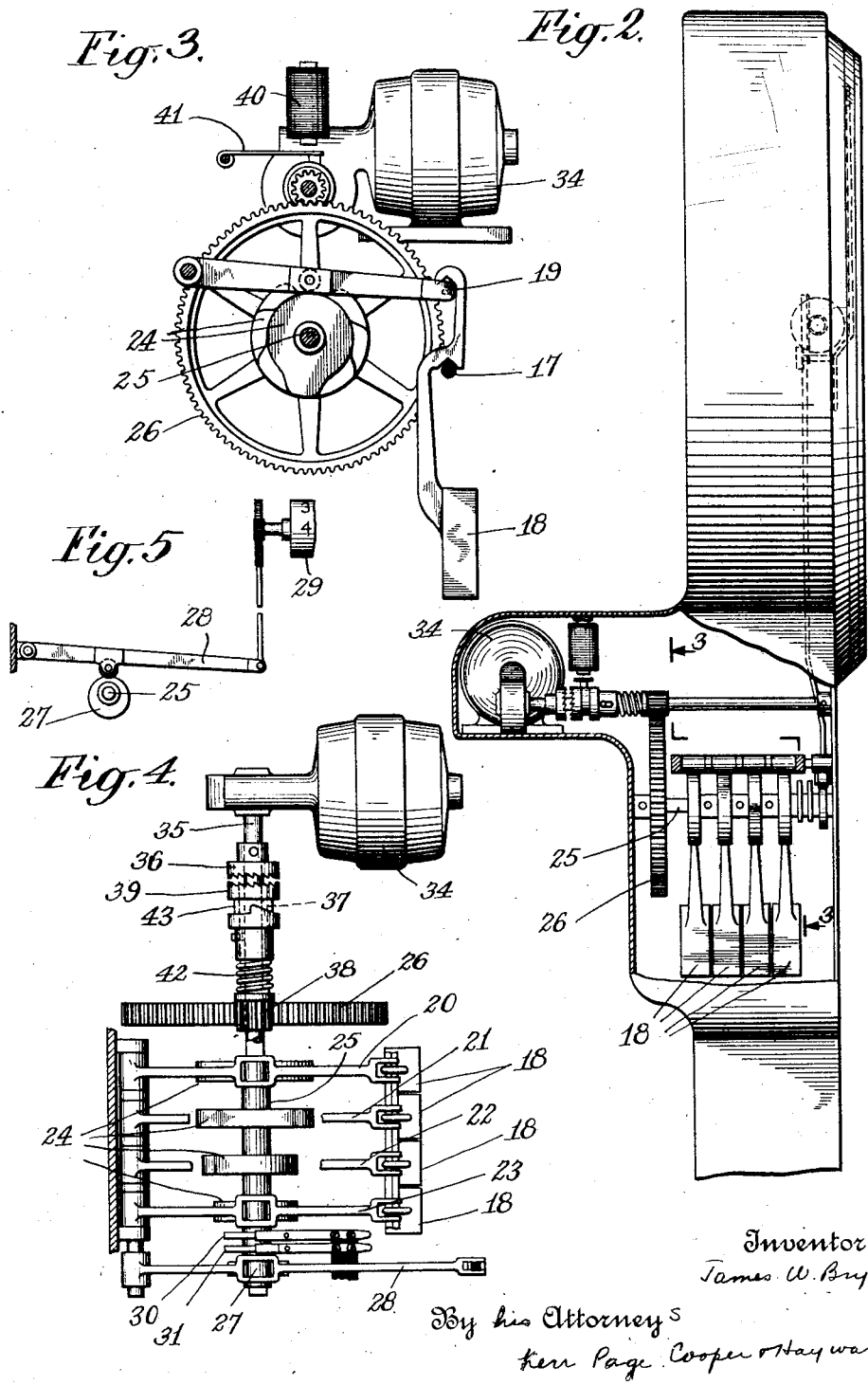
Inventor
James W. Bryce
By his Attorneys
Kerr Page Cooper & Hayward March 6, 1928. 1,661,555
J. W. BRYCE
SCALE
Filed May 12, 1921    4 Sheets-Sheet 3
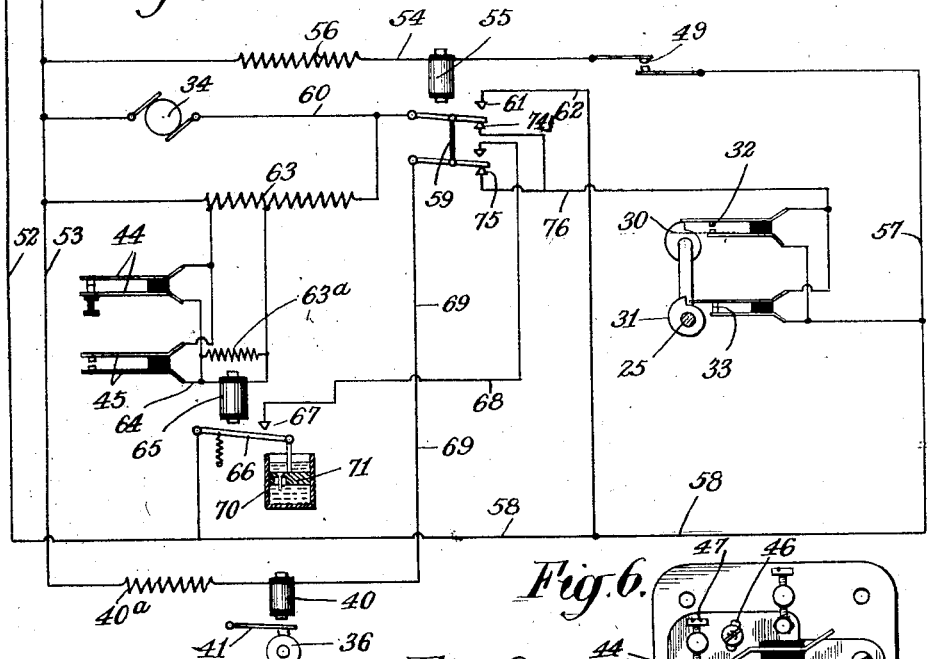
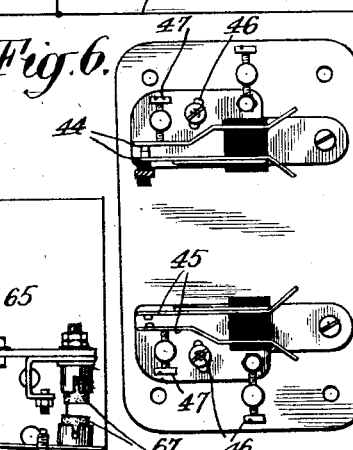
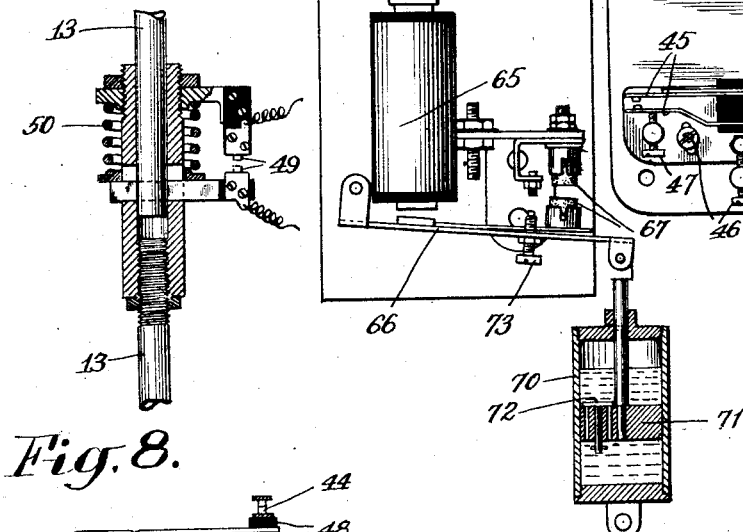
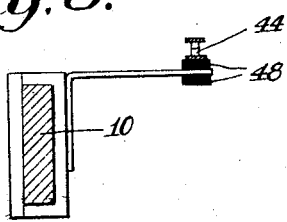
Inventor
James W. Bryce
By his Attorneys
Kerr Page Cooper & Hayward

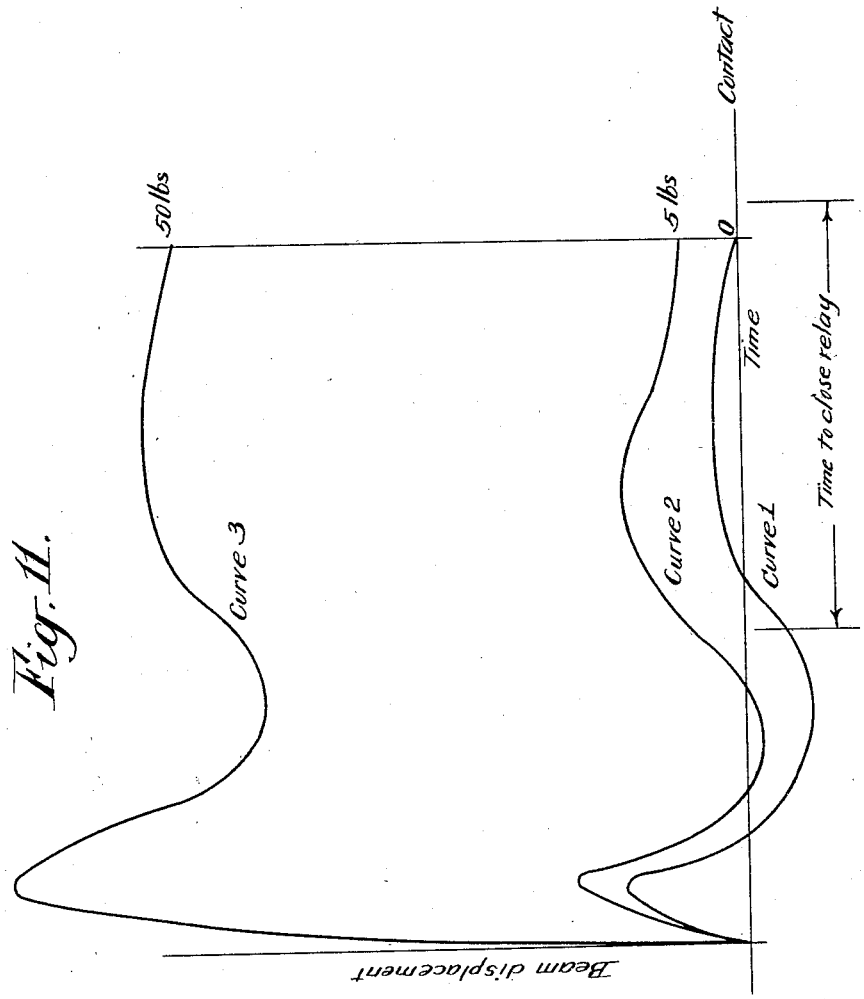

Patented Mar. 6, 1928.

1,661,555

UNITED STATES PATENT OFFICE.

JAMES W. BRYCE, OF BINGHAMTON, NEW YORK, ASSIGNOR, BY MESNE ASSIGNMENTS, TO DAYTON SCALE COMPANY, OF DAYTON, OHIO, A CORPORATION OF NEW JERSEY.

SCALE.

Application filed May 12, 1921. Serial No. 468,834.

The present invention relates to improvements in weighing scales, and more particularly to improvements for automatically offsetting the applied load.

In the drawings

Fig. 2 is a side view of the scale with a portion of the housing shown broken away.

Fig. 3 is a detail showing the motor and the connections which are employed for applying capacity weights to a movable part of the scale.

Fig. 4 is a detail view showing in plan the parts shown in Fig. 3.

Fig. 5 is a detail showing the capacity weight indicator setting device.

Fig. 6 is a detail showing certain of the electric contact devices.

Fig. 7 shows a diagram of the electric circuits.

Fig. 8 shows a detail of the actuating member for the contacts shown in Fig. 6.

Fig. 9 shows a detail enlarged view of the controlling relay and associated parts.

Fig. 10 shows a draft rod switch to interrupt the supply of current when there is no load upon the scale.

Fig. 11 shows a diagrammatic figure showing the action of a scale beam under certain varying load conditions.

Figure 1:
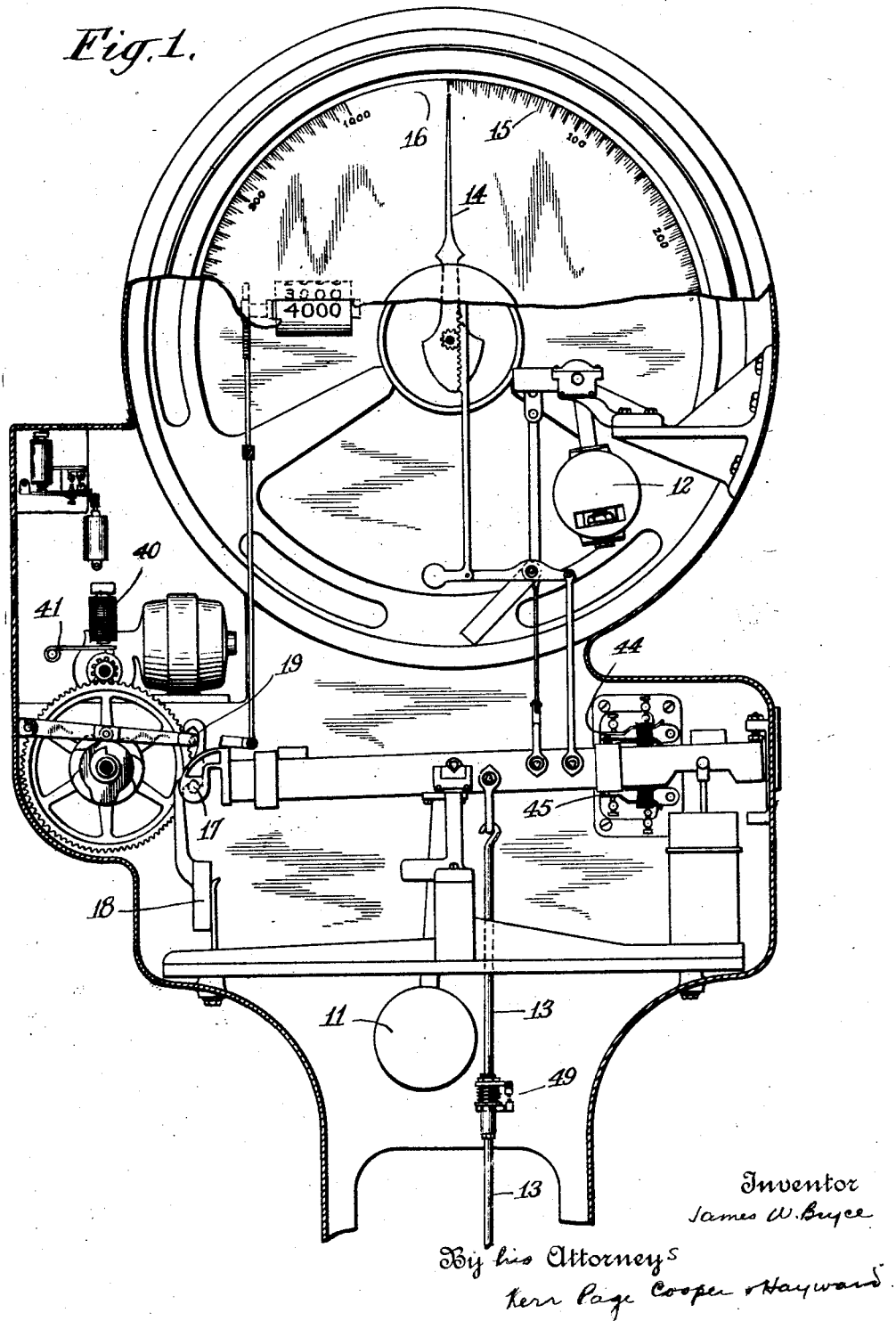
Fig. 1 shows a front elevation of a scale embodying my improved constructions.

The scale to which my invention is here shown as applied is of a type well known in the art as an international 601 scale, and requires no detailed description. In main, the scale comprises a fulcrum beam 10, having connected thereto the automatic counter balancing means in the form of pendulums 11 and 12. A draft rod 13 connects the beam with the base lever system and platform (not shown) and suitable connections from the beam variably displace a pointer 14 over a dial 15 in accordance with the displacement of the beam as controlled by the automatic counterbalance. As customary in scales of this sort, the graduation range of the dial corresponds to the range or capacity of the automatic counterbalance. Here the dial is shown with 1000 pounds capacity, and intermediate the 1000 and zero graduation is a clear space 16.

Scales of this type are fully automatic for loads within the range of the dial. For greater loads, supplementary load offsetting means are used. These usually comprise a series of capacity weights which are manually applied to some movable scale part such as the beam. The weights react against the beam and exert sufficient force to again bring the parts under the control of the pendulums.

In the present invention, I provide means for automatically setting into operation a controlling means for the supplementary load offsetting means, so that the force exerted thereby upon the beam will change automatically whenever the indicator reaches its maximum position or returns to slightly behind its zero position.

While the control here described is particularly adaptable for controlling the application of so-called capacity weights, it may be used for controlling other forms of load offsetting mechanism as will be readily understood by those skilled in the art.

Upon the end of the beam 10, I provide an adjustable nose piece which carries a knife edge 17 adapted to receive a plurality of capacity weights 18. Each capacity weight has a V-notch to cooperate with the knife edge 17 carried by the beam, and a second V-notch to cooperate with a knife edge 19 carried by a shifter arm. There is one of these shifter arms for each weight. I have here shown four capacity weights 18 and four shifter arms 20, 21, 22 and 23. In order to successively actuate the shifter arms to successively remove the weights from the beam I employ a number of cams 24 carried by shaft 25.

A capacity weight changing mechanism of this type is shown and described in further detail in the application of Robert Craig, Serial No. 439,334.

The shaft 25 is suitably journaled and has fast thereto a driving gear 26. The shaft is also provided with a cam 27 which is suitably shaped to actuate a follower 28 and differentially position a capacity weight indicator 29 (see Fig. 5). Upon the end of the shaft 25 are a pair of one revolution cams 30 and 31. These cams are of identical contour and are slightly displaced angularly relatively to each other so as to close and open pairs of contacts 32 and 33. The purpose of these cams is to maintain a circuit (which will be hereafter described) closed during substantially their entire revolution and to open this circuit substantially at the end of one revolution of shaft 25.

The capacity weight changing mechanism herein shown is intended to operate in the following cycle. Normally, with no load upon the beam, all capacity weights are upon the beam; upon the application of a load these weights are removed one by one until the combined forces of the remaining weight or weights and the automatic counterbalance balance the load. The removal of further weights is then interrupted. If the load thereafter be entirely removed, the capacity weight changing device will continue in its cycle until all the weights are removed and again re-applied to the beam. This cycle is desirable but not essential.

The invention may also be used in connection with scales of the well known type in which the weights are normally "off" and placed "on" as needed, or with other constructions in which load offsetting mechanism is to be controlled in accordance with loading conditions of a scale element.

It will be understood that the removal and application of weights to the beam is secured by rotating the driving gear 26 and the cams 24. To effect this rotation a motor 34 is provided which drives a shaft 35 carrying a toothed clutch member 36. A rotatable sleeve 37 on the shaft carries a pinion 38 which meshes with gear 26. Slidable endwise upon the sleeve and fixed against relative rotation thereto is a complementary toothed clutch member 39. Engagement of the clutch is attained by the electrical energization of a clutch magnet 40 which withdraws an arm 41 from a cam groove in the complementary clutch member and allows a spring 42 to force the clutch elements together and couple the motor to the gear 26. De-energization of the clutch magnet allows the arm to drop back in the cam groove and the cam the clutch elements apart. The clutch is disengaged at a predetermined point in the rotation of sleeve 37, since there is a single camming point in groove 43. This point of disengagement is timed with respect to the actuation of the shifter arms by the cams so that the disengagement is effected just after the elevation of one arm and before the actuation of the next shifter arm. The clutch magnet arm 41, in addition to disengaging the clutch at a predetermined point, locks the sleeve 37 and the capacity weight changing mechanism against further rotation. Clutches of this type actuated magnetically are well known in the tabulating machine art. When the clutch is engaged and the motor 34 energized, the rotation of the motor will cause the weights to be successively removed from the beam. Disengagement of the clutch will lock the weight changing mechanism and thereafter permit the free rotation of the motor.

In order to automatically effect changes in the supplementary load offsetting mechanism I provide a control system which will now be described.

Disposed adjacent the beam are pairs of control contacts 44 and 45. These contacts are mounted so as to be adjustable up and down by adjustment devices 46 and the contact opening is adjusted by the contact adjusting screws 47. Extending rearwardly from the beam is an arm (Fig. 8) which carries an insulating block 48. Upon the movement of the beam to a predetermined downward position (in the present embodiment corresponding to the position of the beam with the pointer just beyond 1000 pounds) the contacts 45 are closed. Similarly, upward movement of the beam to a predetermined point, closes the upper control contacts 44. In intermediate positions both contacts are open.

I also provide so-called draft rod contacts which are adapted to maintain open circuit conditions when there is no load upon the scale and close the circuit upon the application of a load. These contacts are shown at 49 in Fig. 10. The draft rod is made in two parts with a lost motion spring connection 50 therebetween. Upon the application of a load upon the draft rod, the spring yields allowing the contacts 49 to come together and close a circuit. Upon the removal of load or with no load upon the scale, the spring extends and the contacts open, thereby interrupting the circuit.

In the use of controlling contacts operated by a scale beam or like element a number of conditions arise which have heretofore made devices of this sort very unreliable. Difficulty has been experienced with the pitting and burning of the contacts. The exact timing of contact opening and closure has not been secured, and if temporarily attained would soon change so as to necessitate contact adjustment or replacement. I have found that with contacts of this sort where pressures are frequently very light and of varying intensity it is necessary to prevent in some way the arcing burning or heating effect at the contacts. Current flow through the contacts must be kept low and the open circuit voltage across the contacts when they are open must be low, preferably below 50 volts. Otherwise it is found that as the contacts are slowly opened or closed with a light pressure such as would be secured from a scale beam, that heating and consequent contact deterioration rapidly d- velop. Furthermore the time of the ultimate opening of the controlled circuit will be very inexact since current will continue to flow after the contacts are actually opened unless the arc at the contacts is prevented.

To prevent these objectionable actions I provide means for controlling the amount of current and the open circuit voltage across the contacts.

Another condition which arises with beam actuated contact controls is that under certain conditions the contacts are actually reopened and again closed when it is intended that a single contact be made and maintained, or broken and kept broken. Also under other conditions a vagrant contact may be made which is due to some extreme condition of loading.

In Fig. 11 I have diagrammatically shown the action of a scale beam in actuating controlling contacts. Assume that the scale has a load of exactly 2000 pounds. It is obvious that this weight may be balanced by automatic counterbalance and a single capacity weight, or by two capacity weights of a load offsetting value of 1000 pounds each. The control device must therefore determine whether one or two weights are to remain upon the beam. Under these conditions hunting will tend to take place, and the capacity weights will be alternately removed and applied. Such action is objectionable and should be prevented. If the beam moves definitely away from one controlling contact and remains away the controlling action may readily be obtained, but in practise it is usually found that the scale beam does not operate in such a simple manner but has in itself an oscillating tendency which tends to first break a contact, then to re-establish it, and finally break it a second time. Such action may repeat a number of times and if not provided for will make the control entirely unreliable.

These conditions are particularly liable to occur when the live load is such as to bring the pointer to either end of the graduated dial. In the diagrammatic view, curve 1 shows in a somewhat illustrative manner the motion of the beam and contact action when the offsetting force and live load are equal. Upon the taking off of capacity weights from the scale beam, it will first move away rapidly from the zero or contact line, thereafter it will swing back in a lower period below the normal line, and then sweep in a still slower period above normal, finally coming to rest at zero.

Curves 2 and 3 show the action with loads in excess of the applied capacity weights.

To prevent contact reclosure and reopening disturbing the control of the load offsetting means when the scale operates under such oscillatory conditions, I provide a suitable means for delaying the establishment of the control circuit until after the preliminary over and under swings of the beam are completed. This control device further prevents the establishment of a controlling circuit when an accidental contact is made by the beam when a heavy load is thrown violently upon the load support.

The method of securing reliable controlling action from beam actuated contacts will best be understood by referring to the circuit diagram, Fig. 7.

Assume first no load upon the scale, and the load offsetting means in normal home position, with all weights 18 upon the beam. Draft rod contacts 49 will be open and contacts 32 and 33 will be both open. No current will now flow through the motor 34 from lines 52, 53. Upon the application of a load to the scale, the draft rod contacts 49 close. Current now flows from line 53, through wire 54, controlling resistance 56, magnet 55, contacts 49, wire 57 and 58 and back to line. The energization of magnet 55 lifts a switch device 59, and closes a circuit from line 53, through wire 60, motor 34, switch 59, contact 61, wires 62 and 58, and back to line. The motor now starts to rotate. The contacts 44 and 45 are both connected in a circuit 64 which includes a relay magnet 65, and this circuit 64 is tapped in shunt or potentiometer circuit across a resistance 63 which is connected to line 53 and line 52 when the switch device 59 is upon the upper contact 61. Resistance 63 is also across the line 52—53 when the circuit is closed and current flowing through the switch 59 and lower contacts 75.

The resistance 63 prevents the open circuit voltage across the contacts 44—45 from reaching the higher line voltage. I have found that 24 volts is a desirable maximum to prevent contact deterioration. Current may flow through circuit 64 and relay magnet 65 whenever either contact 44 or 45 is closed and the circuit through the magnet will be interrupted when both these contacts are open. To prevent sparking at the contacts when circuit 64 is being opened, I may provide a resistance 63ª in shunt around magnet 65.

With the weighing operation starting, contacts 44 will be closed and 45 open, magnet 65 will be energized and relay arm 66 lifted eventually closing contacts 67. Then a so-called controlling circuit will be made from line 52, arm 66, contacts 67, wire 68, switch 59 (now on upper contacts), line 69, clutch magnet 40, controlling resistance 40ª, and back to line 53.

The magnet 40 being energized allows the clutch 36—39 to be engaged and the motor 34 now actuates the capacity weight shifting mechanism and successively removes the weights from the beam. When the proper number of capacity weights have been removed to bring the automatic counterbalance into its range of action, the beam 10 will swing, allowing contacts 44 to open. The control circuit to magnet 40 will be interrupted and the clutch 36—39 disengaged. The weight changing or load offsetting mechanism will be then locked and the capacity weight indicator positioned to show the load offset by the capacity weights.

If a part of the load is now removed and the decrease in weight is such as to cause the beam to swing to a position to close the contacts 44, the control circuit will again be established re-engaging the clutch and causing additional weight or weights to be removed from the beam. The swinging of the beam away from contacts 44 will again stop further weight changing. On the other hand if additional weight be applied to the draft rod and contacts 45 be closed by the beam, the weight changing device will continue its cycle first removing the balance of the weights then reapplying them and afterwards will remove them one by one until the beam again is in a free floating position between the contacts.

Inasmuch as the contacts 44—45 may be reopened after closure and again reclosed when the scale beam is under certain conditions of loading, I provide means for preventing instantaneous closure of the control circuit through the relay arm. This delayed closure of the control circuit is secured by associating a suitable retarding means with the control relay. I have here shown this in the form of a dash pot 70 having a piston 71 suitably connected with the relay arm 66. Other forms of retarding devices may be used. It is desirable that the retarding device have a period of lag of such duration that the preliminary beam movements will be completed or substantially so before the controlling circuit is established. Control of closure may be secured by proper design or adjustment of the dash pot and in practise the amount of lag required will depend largely upon the oscillation characteristics of the operating scale beam. It is also important for proper operation that the relay arm 66 not only close contact 67 after a lapse of time, but that the opening of this contact be made rapidly whenever magnet 65 is de-energized. This action may be secured in many ways, and is here accomplished by providing a check valve 72 in the piston 71. This valve allows the piston to fall rapidly by gravity, and rapidly lower arm 66, and also provides for the proper lag of contact closure when the arm is elevated. Suitable adjustment of contacts 67 may be secured in any way, as by screws 73 (Fig. 9). The retarding of the actual changes of status of the control circuit effectually prevents improper action should the controlling contacts 44 or 45 open and close rapidly or improperly in manner heretofore explained. I do not desire to be limited to a dash pot for retarding the making and breaking of the control circuit. Other and well known means can be used to prevent the circuit being established until the proper time has elapsed for the true beam condition to be determined.

When the weight is entirely removed from the scale the contacts 49 open; magnet 55 becomes deenergized, allowing switch device 59 to fall back upon the lower contacts 74—75. Current now flows through the wire 76 and contacts 32, 33 to wire 57 and 58 back to line. The motor then continues to rotate until such time as contacts 32—33 both are opened by cams 30 and 31. Until this time, the clutch magnet 40 remains energized and the weight changing mechanism is operated. When contacts 32—33 are opened, the motor circuit, the circuit through resistance 63, and the control circuit 69, through the clutch magnet 40, will all be broken. The timing of the conjoint opening of contacts 32, 33 is such that the parts will all be at rest in their normal home positions with all the weights 18 re-applied to the beam and ready for a new operation.

I claim:—

1. In a weighing scale, a scale beam, means for offsetting the load thereon, electrical contacts actuated by said beam, a circuit governed by said contacts for controlling the load offsetting means, means for automatically initiating a load offsetting operation by means of said controlling circuit, and a retarding device for delaying the response of said controlling circuit to the actuation of the contacts by the beam.

2. In a weighing scale, in combination with a scale beam and load offsetting means therefor, of electrical contacts actuated by the beam, means controlled by said contacts for automatically initiating load offsetting and controlling the operation of the aforesaid means, and means having provisions for rendering abnormal operation of said contacts ineffective to control the operation of the aforesaid load offsetting means.

3. In a weighing scale, in combination with a scale beam, of load offsetting mechanism therefor and electrical control devices for said load offsetting mechanism, said devices being controlled in their operation in accordance with the position and loading of said beam, said devices including means for automatically initiating the operation of the load offsetting mechanism at required times, said devices including means for retarding the effective actuation of said devices until the scale beam has completed its preliminary oscillatory motion.

4. In a weighing scale, in combination with a scale beam, of load offsetting means therefor, contacts actuated by said beam, of electrical controlling means for the aforesaid means, said controlling means being controlled by the aforesaid contacts, said controlling means having provisions for automatically restoring the load offsetting means to normal zero position upon the removal of a load from the scale, and a retarding device associated with the aforesaid means and having provisions for delaying the operation of the controlling means for a determined time period after the actuation of the contacts by the beam.

5. In a weighing scale, in combination with a scale beam, of means for offsetting the load thereon, control devices for the aforesaid means, said control devices including contacts actuated by the beam, and a control circuit controlled thereby with provisions for alternatively automatically controlling the load offsetting means to increase or decrease the amount of offset load according to the relative amount of applied load, and means including circuit controlling devices for retarding the closure of said control circuit for a certain period after the initial closure of the said contacts by the beam.

6. In a weighing scale, in combination, a scale beam, an electrically controlled load offsetting means, a plurality of pairs of contact devices adapted to be actuated by said beam and a control circuit for the aforesaid means, said circuit being opened or closed by the opening or closure of either of the said contact devices, and means for delaying the time of closure of the control circuit and for permitting a rapid opening thereof.

7. In a weighing scale, in combination with an element displaced by the weight of the goods of contact devices actuated thereby, a source of current and connections therefrom to said contact devices, said connections including a resistance forming part of a potentiometer across the supply lines for controlling the open circuit voltage across the said contacts to thereby prevent contact deterioration.

8. In a weighing scale having electrically actuated mechanism, in combination with a scale beam, of contact devices actuated thereby, of a circuit for the said contact devices, said circuit including in shunt therewith a controlling resistance forming part of a potentiometer for preventing excessive open circuit voltage and excessive current flow through the contact devices for the purpose set forth.

9. In a weighing scale having an electrically actuated load offsetting mechanism, in combination with a controlling beam, of contact devices actuated thereby, a control circuit for the load offsetting mechanism controlled by said contacts upon their actuation by the beam, a resistance forming part of a potentiometer across the supply lines for the control circuit associated with the aforesaid contact devices for preventing deterioration thereof, and a retarding device for delaying the response of the controlling circuit to the actuation of the contact devices by the beam.

10. In a weighing scale, in combination with an electrically controlled load offsetting mechanism and a controlling circuit therefor, a beam, contact devices actuated thereby, a contact circuit including a controlling relay adapted to be energized upon the closure of the contact devices by the beam to establish the control circuit, and means for governing the operation of said relay to give a delayed closure and quick opening thereof.

11. In a weighing scale having a scale beam, supplementary load offsetting mechanism therefor, a motor for driving the said mechanism, means operated automatically by the placing of a load upon a scale for connecting the motor with a source of current, and means controlled by the position of the scale beam for coupling and uncoupling the motor with the supplementary load offsetting mechanism.

12. In a weighing scale having a scale beam and a connected load support, a load offsetting mechanism, a motor for driving the same, means controlled by the position of the scale beam for coupling and uncoupling the motor with said load offsetting mechanism, means operable automatically upon the application of a load to the load support for connecting the motor in circuit with a source of current, and means for disconnecting said supply circuit upon the removal of a load from the scale.

13. In a weighing scale, in combination with a scale beam and a connected load support, a load offsetting mechanism associated with the beam, a driving motor, means for coupling and uncoupling the motor to said mechanism, a supply circuit for the motor and means for interrupting said circuit upon the removal of a load from the scale and after the motor has restored the load offsetting mechanism to the normal starting position.

14. In a weighing scale, in combination with a scale beam assuming various positions and a connected load support, means for offsetting the load upon the beam, a driving motor therefor, a clutch intermediate the motor and said means, and electrical contact devices actuated by said beam for controlling the operation of said clutch, said contact devices being adapted to control and maintain the clutch disengaged when the beam is in certain positions and to permit the engagement of said clutch upon the beam assuming other positions.

15. The invention set forth in claim 14 in which means is provided for causing the disengagement of the clutch upon the removal of the load from the load support and upon the completion of the operating cycle of said load offsetting means after such removal.

16. The invention set forth in claim 14 in which means is provided for automatically electrically connecting the motor with the supply line upon the application of a load to the load support.

17. In a weighing scale having capacity weights, in combination, a scale beam, a connected load support, means for changing the number of capacity weights upon said beams, a single means for controlling said last-mentioned means to effect either the removal or the application of additional weights to said beam, said last mentioned means including electrical contact devices actuated by the beam.

18. In a weighing scale having capacity weights, in combination, a scale beam, a connected load support, means for changing the number of capacity weights upon said beam, means including electrical contact devices actuated by said beam for controlling said weight changing means, said means being a single means and having provisions for effecting either the removal or application of weights to the beam when the latter is in certain positions and provisions for permitting the number of weights to remain unchanged when the beam is in other positions.

19. In a weighing scale, in combination, a scale beam having capacity weights thereon and automatic load counterbalancing means therefor, means for successively changing the number of capacity weights upon said beam, a single means including electrical contact devices actuated by the beam to control the weight changing means to effect either the removal or the application of weights to the beam.

20. In a weighing scale, in combination, a scale beam, a connected load support, an automatic load counterbalancing means, and means controlled electrically when the capacity of the automatic counterbalance is exceeded by the applied load for changing the number of capacity weights upon said beam, to thereby automatically bring the beam within the range of the automatic counterbalance, said last mentioned means having provisions for automatically effecting a further change in the number of weights when the automatic counterbalance returns to its initial no load position.

21. In a weighing scale, in combination, a scale beam, a connected load support, an automatic counterbalance, a plurality of capacity weights and means for depositing and removing the same from the beam, a motor for actuating said last mentioned means, and electrical control devices including contact devices actuated by a moving scale part for controlling both the deposit upon and the removal of weights from said beam, depending upon the loading of the beam, the number of capacity weights thereon, and the status of the automatic counterbalance.

22. In a weighing scale, in combination with a scale beam and a capacity weight device having a plurality of capacity weights adapted to be deposited upon or removed from the beam, of an electrical control for said device comprising beam actuated contact devices, a controlling circuit controlled thereby and a supplementary means for timing the closure of the controlling circuit.

23. The invention set forth in claim 22 in which the supplementary device comprises a dash pot which effects a retarding of the closure of the control circuit and permits a quick opening thereof.

24. In a weighing scale, in combination with a scale beam and a capacity weight device, of an electrical controlling means for said device comprising beam actuated contact devices and a controlling circuit controlled thereby, said contacts, and a single controlling means having provisions for controlling both the removal and application of weights from and to the beam.

25. In a weighing scale, in combination with a scale beam, of a capacity weight changing mechanism comprising a shaft carrying plurality of cams, a plurality of lifter arms, and a capacity weight on each said arm, a motor for driving the said cam shaft, a clutch for coupling the motor to said shaft, means controlled by the scale beam for controlling the actuating of said clutch whereby the changing of the weights is effected automatically by the motor in accordance with the status of the beam.

26. The invention set forth in claim 25 in which means is provided for establishing a circuit to the motor automatically upon the application of a load to the scale.

In testimony whereof I hereto affix my signature.

JAMES W. BRYCE.